June 9, 1953
J. B. MERRIFIELD
2,641,289
BARK-REMOVING APPARATUS HAVING LOG-ROTATING
AND LOG-ADVANCING PEELER HEADS
Filed June 23, 1952
6 Sheets-Sheet 4
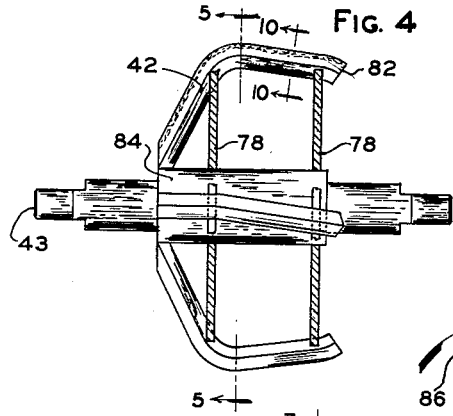
FIG. 4
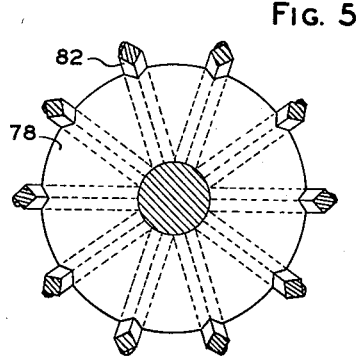
FIG. 5
FIG. 10
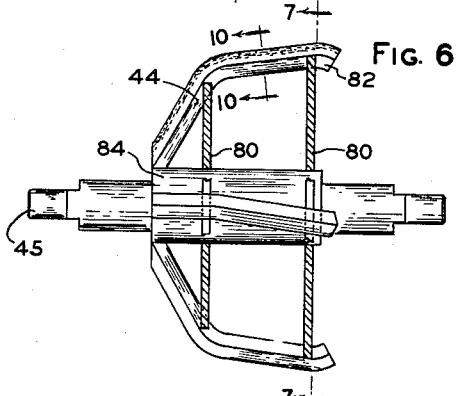
FIG. 6
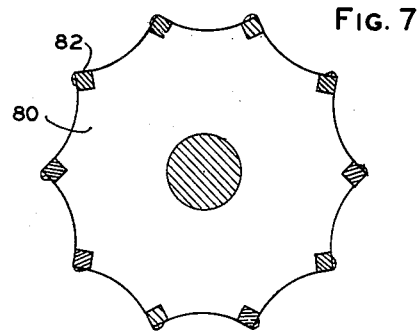
FIG. 7
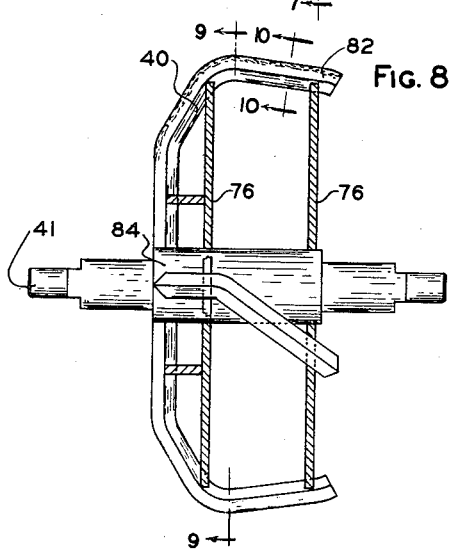
FIG. 8
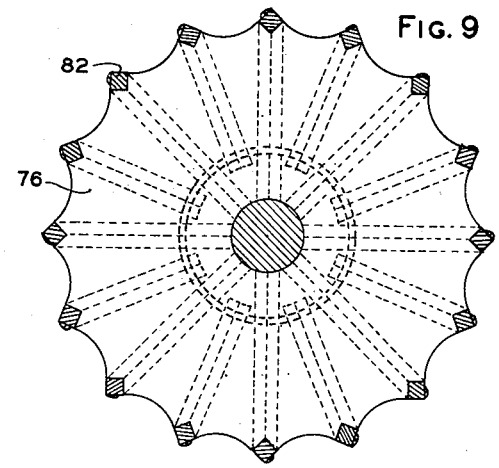
FIG. 9
INVENTOR
JOHN B. MERRIFIELD
BY
Harry A. Mitman
ATTORNEY June 9, 1953   J. B. MERRIFIELD   2,641,289
BARK-REMOVING APPARATUS HAVING LOG-ROTATING
AND LOG-ADVANCING PEELER HEADS
Filed June 23, 1952                              6 Sheets-Sheet 6

INVENTOR
JOHN B. MERRIFIELD
BY
Harry A. Mitman
ATTORNEY

Patented June 9, 1953

2,641,289

UNITED STATES PATENT OFFICE 2,641,289

BARK-REMOVING APPARATUS HAVING LOG-ROTATING AND LOG-ADVANCING PEELER HEADS

John B. Merrifield, Ellisville, Miss., assignor of two-thirds to James B. Fuller, Laurel, Miss.

Application June 23, 1952, Serial No. 295,079

14 Claims. (Cl. 144—208)

This invention relates to an improved apparatus for removing bark from tree logs, and particularly to a bark removing apparatus which removes the bark from logs by a scraping and abrading action as contrasted to true cutting action. More specifically, it relates to a bark removing apparatus for automatically and efficiently removing the bark without substantial loss of wood on logs of various sizes and irregular shapes. In use of the improved apparatus, no attendants are necessary to operate the mechanical parts of the machine since when the machine is started, the operation thereafter is automatic.

In the preparation of wood logs for different industries, as the hardboard and paper industries, it is necessary to remove the bark from the logs before the logs are chipped preparatory to steam digesting the material to produce fiber. Other operations, in which logs are used, also require removal of bark from logs before succeeding operations. Examples of such other industries are cutting wood veneers, telephone poles, fence posts and the like.

Different types of log peeling apparatus have been designed but most of them have met with brief acceptance and little commercial success. As a result of this, removing bark from logs by hand peeling, using an axe, drawknife and peeling space, is still broadly used, even though such bark removing methods are slow and expensive.

One of the primary objects of the invention is the provision of an improved bark removing apparatus, which is highly efficient and flexible in that the apparatus may be made up in small or large, stationary or portable units depending upon the need at hand.

Another object of the invention is to provide a machine for peeling bark from logs which may be applied either to small inexpensive and portable units within the financial ability of small operators furnishing logs to the hardboard and pulpwood industry, or to large peeling units built in a fixed location as at the site of a mill requiring peeled logs in large quantities.

A further object is to provide a log peeling apparatus which may be adjusted either to remove the bark, or even abrade into the surface of the log to form chips or shredded wood to suit the requirements of the user.

A still further object is to provide an apparatus which will effectively remove bark from logs of various sizes whether they be crooked, knotty or uniform in shape, leaving knots and protrusions so that shrinkage in wood is at a minimum.

An additional object is to provide an apparatus which will effectively remove the bark and at the same time convey the debarked log forward through the apparatus, thus eliminating separate conveying elements sometimes found on debarking machines.

Additional more specific objects of the invention are:

To provide rotating abrading elements or peeler heads positioned in different horizontal planes and spaced apart to form a substantial V thus forming a cradle to receive the log for barking.

To provide rotating abrading elements or peeler heads to form a unit with each head in a unit rotating at different peripheral speeds.

To provide a debarking apparatus in which the parts rotate at relative low rates of speed and still obtain rapid removal of bark and forward movement of the log through the machine.

To provide a debarking apparatus including as many units as desired, and the units being flexibly connected through use of universal joints and telescopic shaft connections between corresponding rotating abrading elements or heads of the respective units.

To provide rotating abrading elements or peeler heads having abrasion bars spaced around the periphery of the head at acute angles to the longitudinal axis of the head, such angular arrangement of bars providing a somewhat scraping, wedging or slicing motion into the bark on the log.

To provide rotating abrading elements or peeler heads to propel the log through the peeling apparatus as a function of conveying, by the positioning and setting of each peeler head so that its plane of rotation is at an angle to the longitudinal axis of the log, and by virtue of the rotation a force will be imparted to the log to move the log longitudinally through the peeling apparatus.

Other objects will be apparent from the following description and study of the accompanying drawings, wherein:

Figure 4 is a side elevation of the abrading element or peeler head positioned in the middle horizontal plane of Figure 3.

Figure 5 is a sectional view on line 5—5 of Figure 4.

Figure 6 is a side elevation of the abrading element or peeler head positioned in the uppermost plane of Figure 3.

Figure 7 is a sectional view on line 7—7 of Figure 6.

Figure 8 is a side elevation of the abrading element or peeler head positioned in the lowest plane of Figure 3.

Figure 9 is a sectional view on line 9—9 of Figure 8.

Figure 10 is an enlarged section on lines 10—10 of Figures 4, 6 and 8.

Figure 1:
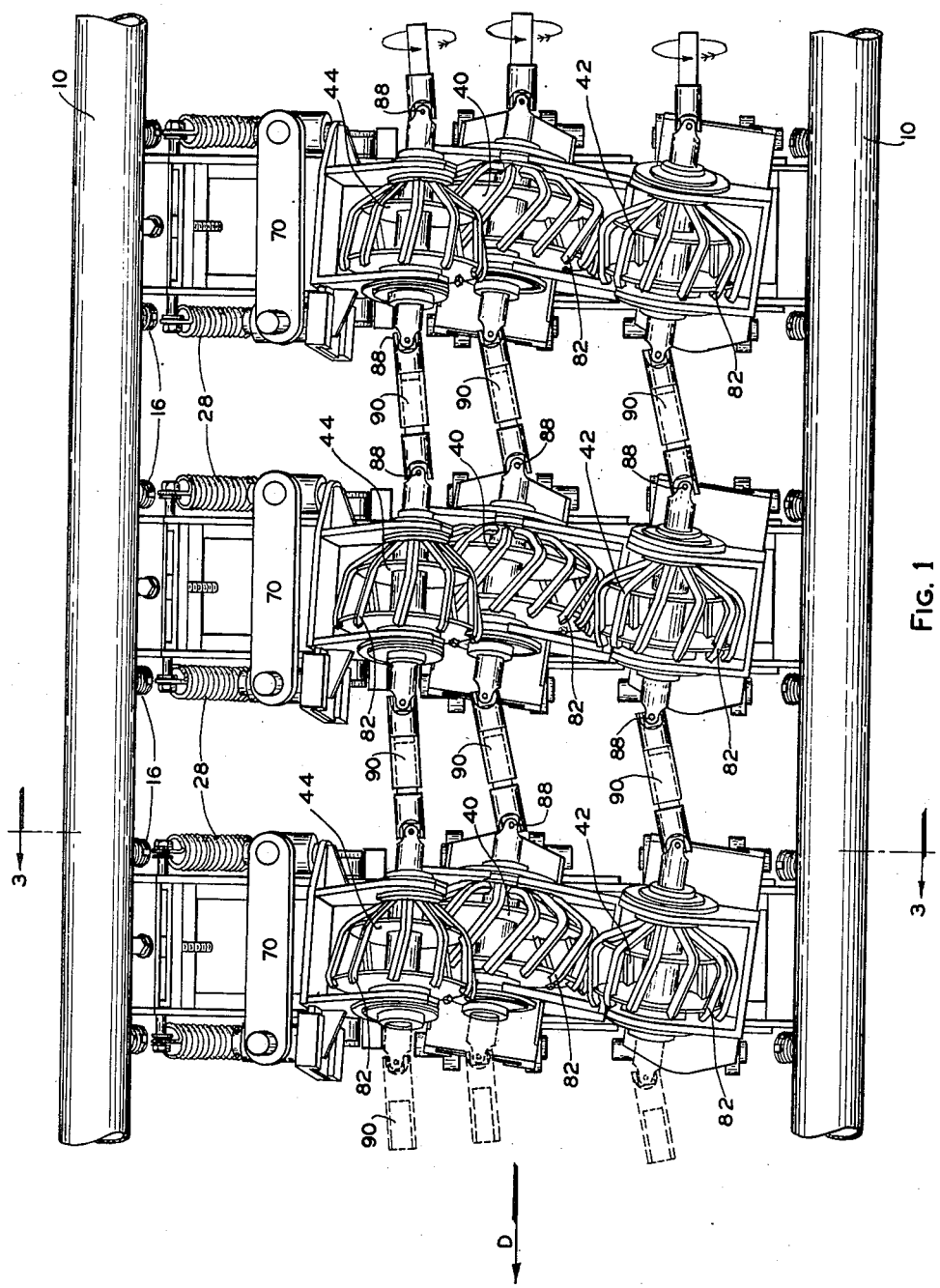
Figure 1 is a plan view of the log peeling apparatus showing three peeling units in tandem arrangement with the units connected by flexible power transmitting means.

Referring now more specially to the accompanying drawings wherein like numerals identify similar parts throughout the various views, 10 indicates a suitable supporting frame including spaced apart, substantially parallel bars mounted on a rigid base 11. Downwardly spaced lugs 12 are positioned along the length of the frame 10. Suspended between spaced bars 10 is a substantially U-shaped frame 14, made up of spaced apart members, which are resiliently mounted on springs 16, and springs 16 are in turn mounted on supporting bars 18 which are swingably anchored to lugs 12 at 20. Spaced upright members 22, pivoted on 14 at 24 form a supporting arm 26 for a peeler head to be discussed below. Springs 28, anchored at one end to bolt 32 which connects the spaced members 22 and the other end anchored to bolt 30 extending between the members of frame 14, tend to pull the arm 26 into contact with arm stop 34. Tension on springs 28 may be varied by turning bolt 36 which will move bolt 30 within slot 38. Arm stop 35 will prevent the arm 26 from being pushed backward against frame 10. The length of arm 26 above the pivot point is so measured and the pivot point 24 is so positioned that an approximately constant relationship is maintained between the peeler heads and logs of varying diameters.

Abrading elements or peeler heads 40, 42, and 44, positioned in three different horizontal planes, are arranged to form a substantially V-shaped cradle or arrangement to receive a log therebetween.

Peeler heads 40 and 42, having conventional shafts 41 and 43, are suitably mounted on bearings 46 and 48 supported on brackets 50 and 52. Brackets 50 and 52 are in turn supported on bracket supports 54 and 56. Brackets 50 and 52 are adjustable vertically by loosening set screws 58 and 60, and the same brackets are adjustable horizontally by loosening set screws 62 and 64, and moving the brackets to the desired position followed by retightening of the loosened set screws.

Figure 12:
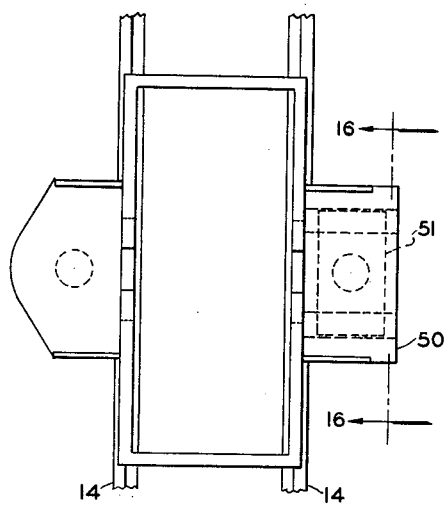
Figure 12 is a plan view of a bracket used for supporting peeler head elements.
Figure 13:
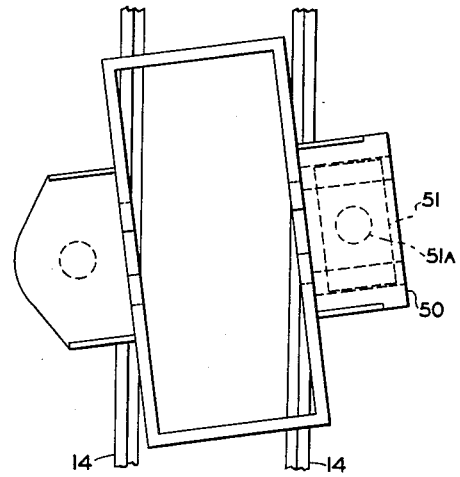
Figure 13 is a plan view of a bracket in one of the adjusted positions.
Figure 14:
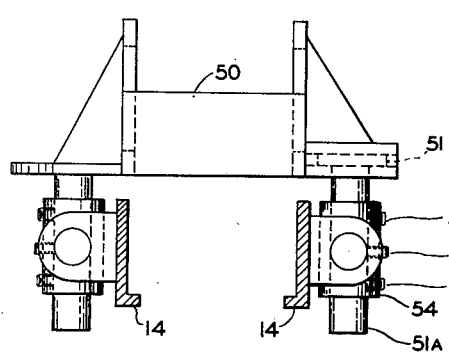
Figure 14 is an end view of the bracket shown in Figure 12.
Figure 15:
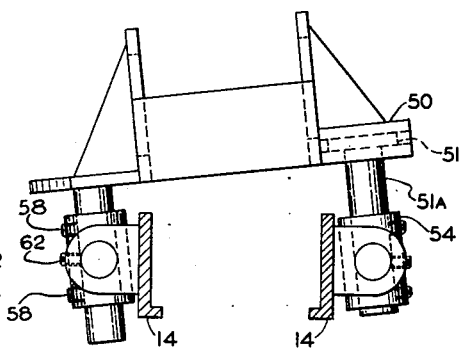
Figure 15 is an end view of the bracket shown in Figure 13.
Figure 16:
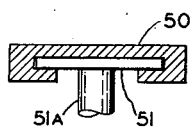
Figure 16 is a view on line 16—16 of Figure 12.

Referring more specifically to peeler head 40, bracket 50 is supported on movable slide 51 which is mounted on pin 51-A. Pin 51-A is slidably and rotatably mounted in bracket support 54. Under operating conditions pin 51-A is held in a fixed position with set screws 58. Adjustability of peeler head 40 to a position of angularity with respect to the log is obtained by loosening the set screws 58 and 62 thus enabling movement of bracket 50 to incline the bracket in the vertical plane (see Figures 14 and 15), and also enabling rotation of bracket 50 in the horizontal plane (see Figures 12 and 13). The arrangement to obtain adjustments in the vertical and horizontal planes as described in relation to bracket 50, is duplicated on brackets 52 and 68 so that similar flexibility of adjustment may be provided in peeler heads 42 and 44.

Peeler head 44, positioned on shaft 45, mounted on suitable bearings 66 at each side of the peeler head, and the bearings are in turn mounted on bracket 68. Bracket 68 is mounted on bracket support 70, which is adjustable both vertically and horizontally with respect to supporting arm 26, by adjusting set screws 72 and 74, depending upon the adjustment desired.

The peeler heads 40, 42 and 44 (as shown in Figures 8, 4 and 6 respectively), are made up of spaced apart substantially circular plates 76 (Figures 8 and 9), 78 (Figures 4 and 5) and 80 (Figures 6 and 7). Abrasion bars 82, which are substantially square in cross section, are uniformly spaced around the peripheral edges of the spaced apart plates and bent downwardly to be welded to the hubs 84 of the respective peeler heads as shown in Figures 4, 6 and 8. If desired, one edge of abrasion bars 82 may have a built-up area of hardened material 86 (Figure 10) having high abrasion resistance to improve the usefulness and longer wearing properties of the abrasion bars.

Figure 4 is a side elevation of peeler head 42, certain parts being broken away and shown in section, and Figure 5 is a sectional view on line 5—5, and together these figures show the manner in which the abrasion bars 82, which are anchored to hub 84 are bent over and secured to the spaced apart plates 78. In Figures 6 and 7, and 8 and 9, are shown the arrangement of abrasion bars 82 with reference to plates 80 and 76 respectively. As a result of having each bar bent in a circumferential direction so that the abrading portion of the bar lies at an acute angle to a plane which intersects said abrading portion and which also contains the axis of rotation of the peeler head, abrasive action of the bars on the bark will be improved. In the case of the abrasion bars 82 on peeler heads 42 and 44, the acute angle of the abrading portion, as just defined, may vary between 3° to about 15°; an angle of 7½° has given excellent results. In the case of the abrasion bars on peeler head 40 (Figure 8), such an acute angle may vary between about 3° and 45°. It must be understood that the abrading portion of a bent bar makes an angle of attack, which is defined as the acute angle between said abrading portion and a plane which intersects said abrading portion and which also contains the longitudinal axis of a log being peeled, will vary with the condition of the log, season of the year, and the type of wood. These angles of attack may be varied by adjusting the setting of the peeler heads through movement of brackets 50, 52 and 68.

Figure 2:
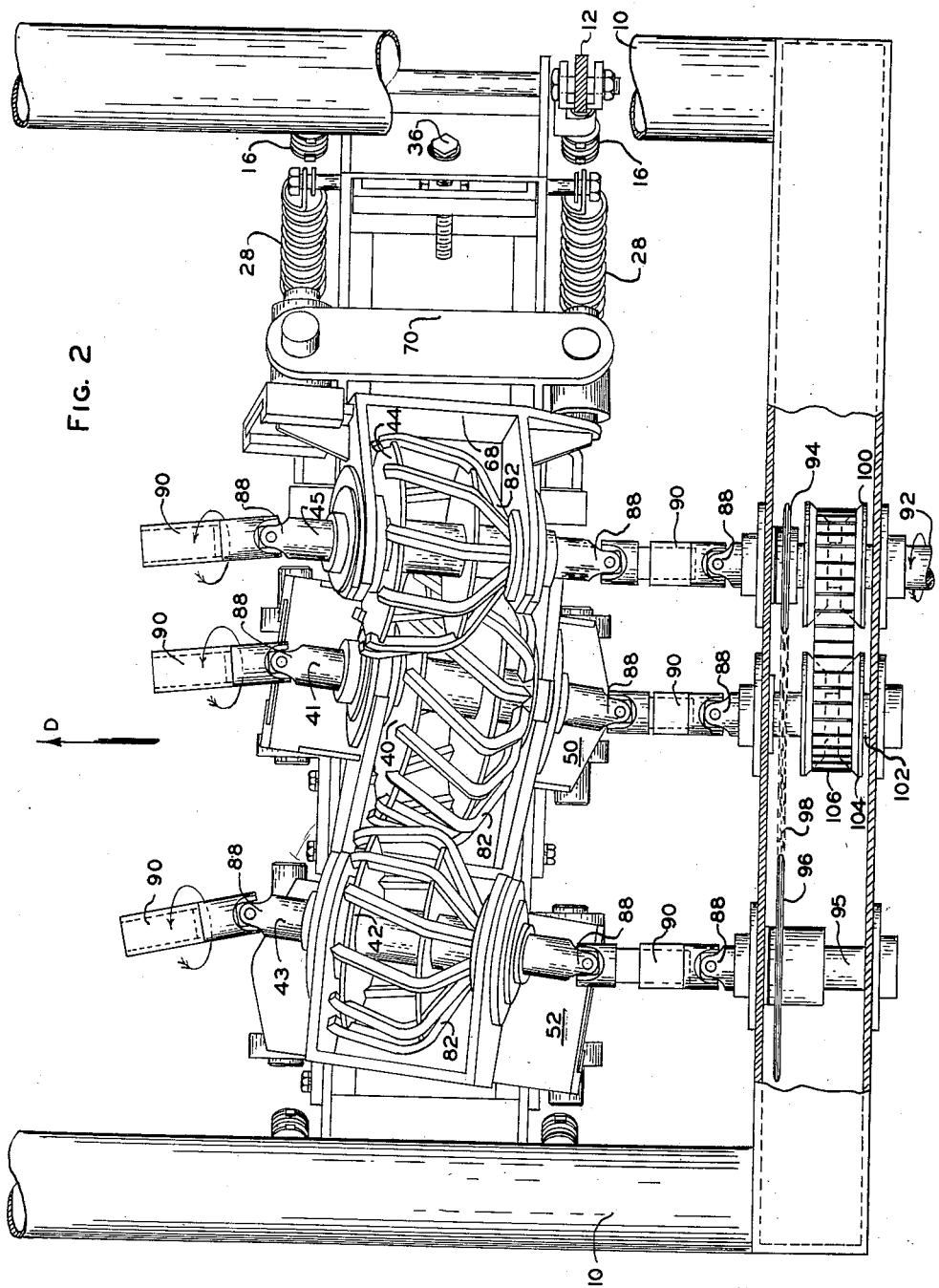
Figure 2 is an enlarged plan view of one of the peeling units shown in Figure 1 and also shows means to impart rotating power to the unit.
Figure 3:
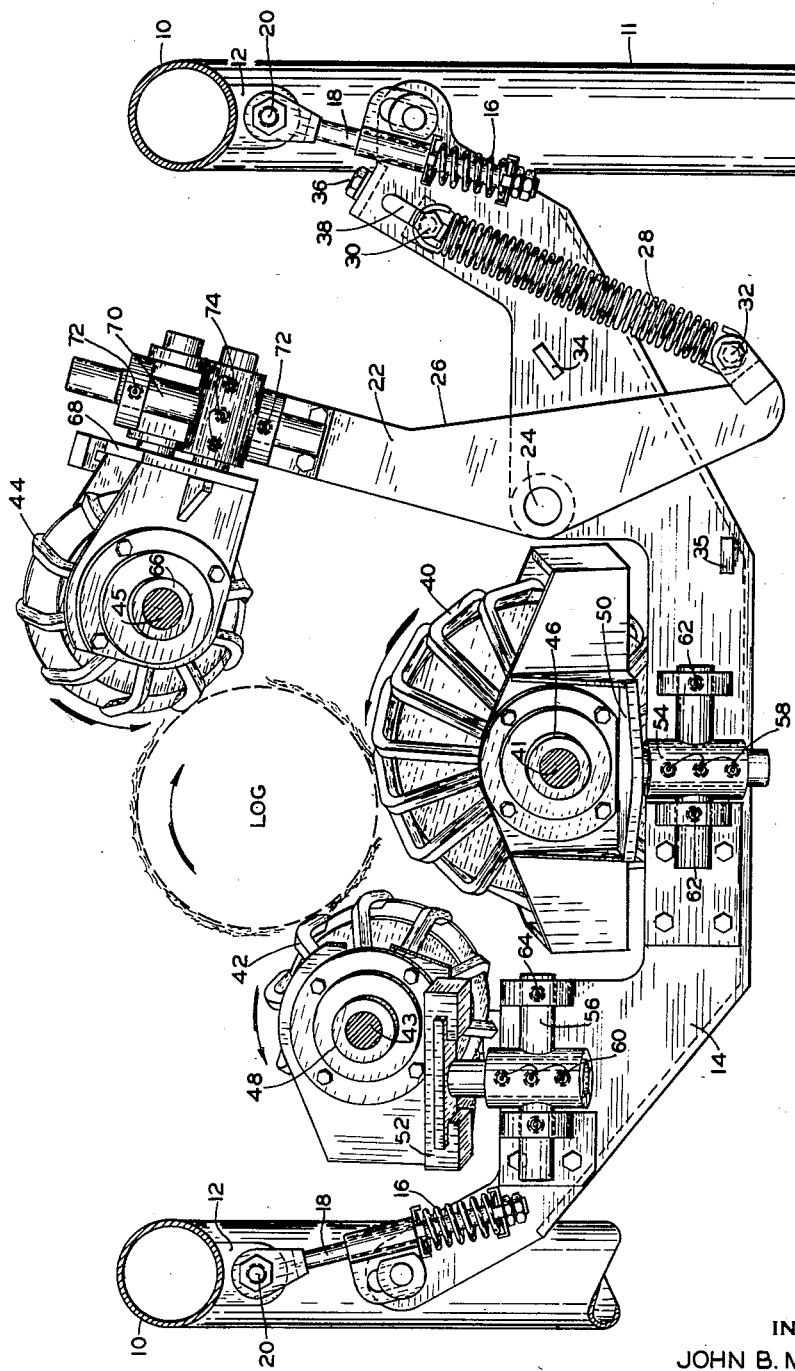
Figure 3 is a sectional elevation on line 3—3 of Figure 1, showing the relative positions of the peeler heads or abrasion elements in three different horizontal planes and the resilient suspension of the unit, and further shows in dotted lines the position which a log passing between the peeler heads will attain when placed into the unit.

As shown in Figure 3, three peeler heads, viz. 40, 42 and 44 make up a peeling unit and these heads are mounted in a substantially V-shaped arrangement and form a cradle to receive the log which will be peeled. The whole peeling apparatus is made up of a multiplicity of peeling units interconnected in tandem arrangement by universal joints 88 and telescopic shaft connections 90. Through use of universal joints 88 and telescopic shaft connections 90, the peeling machine is flexible and will yield to movement of the operating parts without difficulty. The telescopic shaft connections 90 are made up of a substantially square male portion fastened to the universal joint 88 of one unit and projecting into a corresponding female portion fastened to a universal joint 88 of the corresponding peeler head of the adjacent peeler unit. Reference to Figures 1 and 2 will show the connection between the peeling units making up the apparatus. Any number of peeling units may be interconnected to form a machine, usually three to five units. In Figure 1, a portion of the apparatus is shown with three connected peeling units.

The peeling apparatus is driven by any conventional source of power, such as a gasoline engine, electric motor or the like. In Figure 2, a driving mechanism is disclosed in which shaft 92, driven by an engine (not shown) will drive sprocket 94. Mounted on shaft 95 is sprocket 96, and sprockets 94 and 96 are connected by an endless sprocket chain 98. Sprockets 94 and 96 will drive each of the peeler heads 42 and 44 at a constant speed, however, due to the difference in diameters of sprockets 94 and 96, the peeler heads 42 and 44 will operate at different speeds. Since sprocket 94 has a smaller diameter than 96, peeler head 44 will travel at the greater speed. Mounted on shaft 92 is an adjustable pulley 100, and on shaft 102 is mounted adjustable pulley 104. Connecting pulleys 100 and 104 is belt 106 and as the pressure on the adjustable pulleys is increased or decreased, as for example through a conventional variable speed drive mechanism, the speed of pulley 104 may be varied, so that peeler head 40 may be operated at varying speeds.

It has been pointed out that peeler heads 40, 42 and 44 rotate in the same direction and at different circumferential speeds. The peeler head 44 positioned in the uppermost horizontal plane rotates at the fastest speed, peeler head 42 positioned in the intermediate plane rotates at the lowest peripheral speed; and peeler head 40 positioned in the lowest horizontal plane with respect to peeler heads 42 and 44, rotates at a speed between the speeds of heads 42 and 44. Preferably, peeler head 40 should be equipped with a variable speed control so that the head may be rotated at varying speeds depending upon the nature of the bark and type of wood.

As an example of speeds used for satisfactory barking of logs, when peeler head 42 was rotated at a speed of 940 inches per minute, peeler head 40 was rotated at a circumferential or peripheral speed of 4800 to 6730 inches per minute, and head 44 was rotated at a speed of 7500 inches per minute. These speeds may, of course, be varied but generally the ratio of speeds may broadly be stated with reference to the heads 42, 40, and 44 as follows: 1 (42) to 3—7 (40) to 8 (44). These speeds and ratio of speeds are given as examples only and not as controlling limitations.

In operation, the logs are dropped into the machine from the side so that the log will be positioned with reference to peeler heads 40, 42 and 44 substantially as illustrated in Figure 3. With the peeler heads of the several units rotating counterclockwise, at different peripheral speeds and with the abrasion bars 82 of the several heads digging into the bark at acute angles, the bark will be removed and at the same time the log will be moved forward as shown in the direction arrows D (see Figures 1 and 2). After the log has passed between the peeler heads of the several peeler units making up the machine, the log will be free of bark without shredding, bad marking or splintering of the wood. On actual tests, average size logs move through the machine in 3 to 5 seconds and are substantially free of bark. Logs of varying size from 3 up to 18 inches in diameter have been passed through the machine with good debarking results.

Unusual flexibility is obtained through use of the present machine. It has been pointed out above that the peeler heads may be positioned at angles to the longitudinal axis of the machine by adjusting the peeler heads either horizontally or vertically by adjusting the supporting brackets of the peeling rolls 40, 42 and 44. Normally the axis of rotation of each peeler head is positioned at an acute angle with reference to a plane which intersects said axis and which also contains the longitudinal axis of the machine, the latter roughly coinciding with the longitudinal axis of a log being peeled. Also, since each peeler head 40, 42 and 44 is made up of abrasion bars 82 spaced around the peripheral edges of the heads, and arranged evenly spaced around the hub and fanning outwardly from the hub to substantially concentric limits of an imaginary right cone frustrum, the abrading portion of each of the bars makes the same acute angle with a line which intersects said abrading portion and which also lies parallel to the axis of rotation of the peeler head. Thus, each of the axes of rotation of the peeler heads lies at an acute angle to an intersecting plane containing the longitudinal axis of the machine, and also each of the abrasion bars makes an acute angle with an intersecting line lying parallel to the axis of rotation of the respective peeler head.

Since the several peeler heads are resiliently supported from the rigid supporting frame, power is smoothly transmitted from shaft 92 through the universal joints, telescopic connections and peeler heads of each peeling unit and on to the next peeling unit connected thereto with little or no detrimental vibration.

Figure 11:
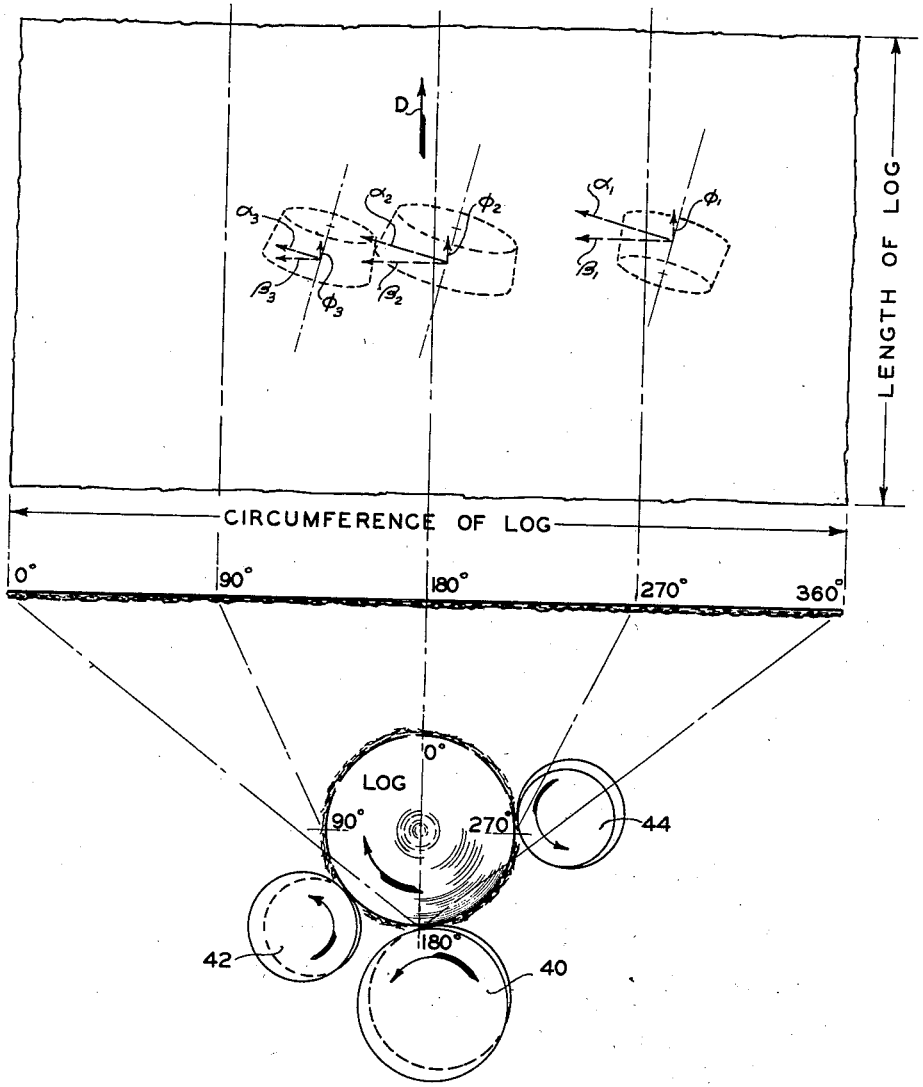
Figure 11 is a diagrammatic layout showing the relative positions of the peeler heads with reference to the log, and the force diagrams pertaining to the several heads.

A study of Figure 11 shows the manner in which the transmitted power is believed to be broken into resultant forces whereby the peeler heads simultaneously remove the bark and move the log forward to the next peeling unit. In Figure 11, $a_1$, $a_2$ and $a_3$ designate the applied force originating in the engine and applied to the log by the respective peeler heads. $B_1$, $B_2$ and $B_3$ represent the component of the applied forces which is perpendicular to the longitudinal axis of the log and tends to abrade the bark from the log which is rotated clockwise as a result of the counterclockwise movements of the peeler heads. $\phi_1$, $\phi_2$ and $\phi_3$ represent the component of the applied forces which is parallel to the longitudinal axis of the log and tends to move the log forward through the machine. Further, in Figure 11, the circumference of the log is shown laid out flat in order to clearly show the relative application of the forces at different points on the log circumference. The length of the force arrows are indicative of the relative force magnitudes.

It will be understood that the invention is not to be limited to the specific construction shown herein. Numerous modifications and changes will occur to those skilled in the art upon reading the specification and upon study of the accompanying drawings. Such modifications are intended to come within the scope of the present invention, and the invention described and claimed herein shall be limited only by the breadth of the claims.

I claim:

1. A log peeling apparatus which comprises a supporting frame, a series of peeling units resiliently suspended from the frame, each peeling unit comprising a plurality of rotating peeler heads positioned in different horizontal planes and rotating in the same direction at different circumferential speeds, and flexible power transfer shafts connecting corresponding peeler heads of the peeling units in the series.

2. A log peeling apparatus which comprises a supporting frame, a series of peeling units resiliently suspended from the frame, each peeling unit comprising three peeler heads positioned in different horizontal planes and rotating in the same direction at different circumferential speeds, the peeler head in the uppermost plane rotating at the highest speed and the peeler head in the intermediate plane rotating at the lowest speed, and flexible power transfer shafts connecting corresponding peeler heads of the peeling units in the series.

3. A log peeling apparatus which comprises a supporting frame, a series of peeling units resiliently suspended from the frame, each peeling unit comprising three peeler heads positioned in different horizontal planes and rotating in the same direction at different circumferential speeds, the peeler head in the uppermost plane being positioned at the end of an arm mounted on a pivot for movement of the head through an arc centered about said pivot, and flexible means including telescopic shafts movably connecting corresponding peeler heads of the peeling units in the series.

4. A log peeling apparatus which comprises spaced parallel members forming a supporting frame and a series of peeling units, each unit comprising a substantially U-shaped frame extending between the spaced parallel members and being supported therefrom, three peeler heads positioned on the U-shaped frame in a substantially V-shaped arrangement, said peeler heads being positioned in different horizontal planes and rotating at different circumferential speeds, the peeler head in the uppermost plane rotating at the highest speed and the peeler head in the intermediate plane rotating at the lowest speed, and flexible means including telescopic shafts coupled through universal joints connecting corresponding peeler heads of the peeling units in the series.

5. A log peeling apparatus which comprises a supporting frame, a series of peeling units resiliently suspended from the frame, each peeling unit comprising three peeler heads positioned in different horizontal planes and rotating in the same direction at different circumferential speeds, bearings supporting each peeler head in the unit, said bearings being mounted on brackets adjustable vertically and horizontally, and flexible means including telescopic shafts coupled through universal joints connecting corresponding peeler heads of the peeling units in the series.

6. A log peeling apparatus which comprises a supporting frame including spaced bars, a series of peeling units resiliently suspended from the frame, each peeling unit comprising three peeler heads positioned in different horizontal planes and rotating in the same direction at different circumferential speeds, and flexible power shafts connecting corresponding heads of the peeling units in the series, said peeler heads in each peeling unit comprising spaced apart circular plates mounted on bearings, and a plurality of angular bars spaced around the peripheral edges of the spaced circular plates and connecting the plates.

7. A log peeling apparatus as described in claim 6, and wherein the portion of the angular bars connecting the spaced plates are bent to form acute angles to intersecting planes containing the longitudinal axis of the peeling apparatus.

8. A log peeling apparatus as described in claim 7, and wherein the angular bars are substantially square in cross section and at least one corner of the square bar includes a built up area of hardened material having high abrasion resistance.

9. A log peeling apparatus which comprises a supporting frame including spaced bars, a series of peeling units resiliently suspended from the spaced bars, each peeling unit comprising three peeler heads positioned in different horizontal planes and rotating in the same direction at different circumferential speeds, and flexible power shafts connecting corresponding heads of the peeling units in the series, said peeler heads in each peeler unit comprising spaced apart substantially circular plates mounted on bearings, mounts supporting the bearings, said mounts being adjustable vertically and horizontally, and a plurality of angular bars spaced around the peripheral edges of the spaced plates and connecting the plates, said angular bars forming acute angles with the respective axes supporting the spaced apart plates.

10. A log peeling apparatus as defined in claim 9, and wherein the peeler head in the highest plane rotates at the highest speed and the peeler head in the intermediate plane rotates at the lowest speed.

11. A log peeling apparatus as defined in claim 10, and wherein the peeler head rotating at the highest speed is positioned at the end of an arm mounted on a pivot to move the head through an arc centered about said pivot.

12. A log peeling apparatus as defined in claim 11, and wherein the axis of each peeler head is positioned at an acute angle to an intersecting plane containing the longitudinal axis of the peeling apparatus.

13. A log peeling apparatus as defined in claim 12, and wherein each of the angular bars on the peeler heads in two upper planes forms an acute angle between 5° and 15°, and on the peeler head in the lowest plane forms an acute angle between 3° and 40° with an intersecting plane containing the longitudinal axis of the apparatus.

14. A log peeling apparatus which comprises a supporting frame including spaced bars, a series of peeling units resiliently suspended from the spaced bars, each peeling unit comprising three peeler heads positioned in different horizontal planes and rotating in the same direction at different circumferential speeds, said circumferential speeds of the peeler heads in the intermediate, lowest and highest plane having a speed ratio of 1 to 3—7 to 8, respectively, and flexible power shafts connecting corresponding heads of the peeling units in the series, said peeler heads in each peeler unit comprising spaced apart substantially circular plates mounted on bearings, mounts supporting the bearings, said mounts being adjustable vertically and horizontally, and a plurality of angular bars spaced around the peripheral edges of the spaced plates and connecting the plates, said angular bars forming acute angles with intersecting lines lying parallel to the respective axes of rotation of the peeler heads.

JOHN B. MERRIFIELD.

References Cited in the file of this patent

UNITED STATES PATENTS

| Number | Name | Date |
|---|---|---|
| 149,107 | Dykeman | Mar. 31, 1874 |
| 827,747 | Moreau | Aug. 7, 1906 |
| 1,082,544 | Matheus | Dec. 30, 1913 |
| 1,294,275 | Johnson et al. | Feb. 11, 1919 |
| 1,986,708 | Bezner | Jan. 1, 1935 |
| 2,390,459 | Power | Dec. 4, 1945 |

FOREIGN PATENTS

| Number | Country | Date |
|---|---|---|
| 122,151 | Sweden | July 6, 1948 |